United States Patent [19]

Barreto et al.

[11] Patent Number: 4,962,729
[45] Date of Patent: Oct. 16, 1990

[54] INSULATED SHELTER FOR PET ANIMALS AND METHOD OF MANUFACTURE THEREOF

[76] Inventors: Aurelio F. Barreto, 4204 W. 137th St., Hawthorne, Calif. 90250; Darrell R. Paxman, 21638 NE. 14th Pl., Redmond, Wash. 98053

[21] Appl. No.: 471,053

[22] Filed: Jan. 19, 1990

Related U.S. Application Data

[63] Continuation of Ser. No. 156,449, Feb. 16, 1988, abandoned.

[51] Int. Cl.$^5$ ............................................. A01K 1/03
[52] U.S. Cl. ............................................................ 119/19
[58] Field of Search ............... 119/19, 15; 52/80, 309.9

[56] References Cited

U.S. PATENT DOCUMENTS

| | | | |
|---|---|---|---|
| D. 200,298 | 2/1965 | Daniel | D30/117 |
| D. 215,306 | 9/1967 | Hoff | D30/117 |
| D. 237,283 | 10/1975 | Evans | D30/117 |
| D. 246,540 | 11/1977 | Burleson | D30/112 |
| D. 257,493 | 11/1980 | Lodrick | D30/117 |
| D. 269,916 | 7/1983 | Lodrick | D30/117 |
| 2,987,043 | 6/1961 | Spindler | 119/19 |
| 3,147,736 | 9/1964 | Daniel | 119/19 |
| 3,308,789 | 3/1967 | Artig | 119/19 |
| 3,468,771 | 9/1969 | Pedlow | 52/309.9 X |
| 3,676,537 | 7/1972 | Winstead | 428/318.8 X |
| 3,960,996 | 6/1976 | Balenski et al. | 428/318.8 X |
| 4,038,350 | 7/1977 | Jaques | 428/318.8 X |
| 4,096,218 | 6/1978 | Yasuike | 428/318.8 X |
| 4,161,924 | 7/1979 | Welker | 119/19 |
| 4,379,103 | 4/1983 | Doerfling | 428/318.8 X |
| 4,602,396 | 7/1986 | Fraige | 428/71 X |
| 4,603,078 | 7/1986 | Zanker et al. | 428/318.8 X |
| 4,671,991 | 6/1987 | Payne | 428/318.8 X |
| 4,721,299 | 1/1988 | Schlientz | 52/309.9 X |

FOREIGN PATENT DOCUMENTS

| | | | |
|---|---|---|---|
| 2227818 | 11/1974 | France | 119/19 |
| 2146941 | 5/1985 | United Kingdom | 428/318.8 |

Primary Examiner—Robert P. Swiatek
Assistant Examiner—Nicholas D. Lucchesi
Attorney, Agent, or Firm—James R. Vance

[57] ABSTRACT

A shelter for pet animals is formed of a molded unitary polyethylene plastic shell having a concave interior surface defining a cavity for sheltering a pet animal. The structure of the shell is formed of a solidified foam core encased within a rigid skin. The pet animal shelter is fabricated by heating a charge of polyethylene plastic under pressure and releasing and dispersing a blowing agent, such as nitrogen gas, into the polyethylene charge. The charge is passed into a mold shaped in the form of a shelter for pet animals. Pressure is reduced on the polyethylene charge in the mold, thereby, allowing the blowing agent to expand the interior of the plastic charge to form a foam core encapsulated within a polyethylene skin. The pet animal shelter insulates the cavity enclosed therewithin from both heat and cold.

14 Claims, 1 Drawing Sheet

INSULATED SHELTER FOR PET ANIMALS AND METHOD OF MANUFACTURE THEREOF

This is a continuation of copending application(s) Ser. No. 07/156,449 filed on Feb. 16, 1988 and now abandoned.

BACKGROUND OF THE INVENTION

1. Field of the Invention

The present invention relates to an improved form of a shelter for pet animals and a method of fabricating a shelter for pet animals.

2. Description of the Prior Art

Shelters for pet animals have long been utilized to protect domesticated pet animals from the cold and from precipitation. For many years pet shelters, such as "dog houses" were constructed of wood. While wooden pet shelters do provide some protection to a pet animal from cold and from precipitation, the extent of protection is limited. The roofs of wooden shelters frequently leak, particularly through cracks between adjacent boards in the roof. Thus, the interior of such a shelter frequently becomes damp during rain and snow, and the pet is often exposed to cold, dripping leaks in the roof of a shelter. Also, the wood will absorb water and will rot and splinter. The primary advantage of a wooden shelter is that it provides an enclosure which a pet animal may occupy. The body heat of the animal is at least partially confined within the enclosure, thereby protecting the animal to a slight extent from the chilling effects of cold weather.

In more recent years plastic structures have been utilized as pet animal shelters. Conventional plastic shelters are formed of a homogeneous plastic material throughout, typically by blow molding or thermocasting. Since pet animal shelters can be formed as unitary structures by conventional blowing molding or thermocasting techniques, animal shelters have been produced which do not have cracks or interstices in the roofs as have been characteristic of prior wooden shelters. Consequently, conventional plastic shelters are far less prone to leak and rot than are wooden animal shelters. However, conventional plastic animal shelters also have several disadvantages.

Conventional plastic structures heretofore utilized as animal shelters have been formed with thin, homogeneous plastic walls. Such a structure provides only very limited thermal insulating characteristics. Consequently, when conventional plastic shelters are utilized out of doors in cold weather, there is only a very limited entrapment of body heat from the animal within the shelter. Furthermore, conventional plastic shelters are very poorly ventilated so that solar radiation is entrapped to a high degree, thus rendering the cavity within the shelter extremely hot when the shelter is exposed to direct sunlight on warm days. As a consequence, plastic shelters have heretofore been too hot to adequately shelter an animal from the sun in warm weather and too cold to protect an animal in cold weather.

SUMMARY OF THE INVENTION

In one broad aspect the present invention is a shelter for pet animals comprised of a molded unitary thermoplastic shell having a concave interior surface defining a cavity for sheltering a pet animal wherein the structure of the shell is formed as a solidified foam core encased within a rigid skin.

In its preferred form the structural foam animal shelter of the invention is additionally comprised of a flat base formed with a solidified foam core encased within a rigid skin. The base is releasably securable to the shell to form a raised, removable floor. The thick insulated floor requires no foundation and provides thermal insulation to the interior of the shelter from a cold or damp earthern surface upon which it may rest. The floor also forms a moisture barrier that prevents the penetration of dampness from beneath which might otherwise result when the shelter is located upon wet ground or damp grass.

The pet animal shelter of the invention is formed of structural foam, preferably of polyethylene plastic, and is non-toxic, odorless and will not irritate the skin of an animal. The structure of the shelter does not splinter and its method of manufacture eliminates dangerous sharp edges. When formed of polyethylene, the structural foam animal shelter of the invention will not absorb either moisture or odor, and therefore will not rot, like conventional wooden shelters. A hard skin is formed on all of the exposed surfaces of the structural foam animal shelter of the invention, both exterior and interior, so that the exposed surfaces are always rigid and smooth. The structural foam animal shelter of the invention has a molded-in color that will not chip, and material preservatives are not required.

The tough and non-porous characteristics of the polyethylene surface of the animal shelter of the invention prevent fleas and ticks from burrowing and incubating in the shelter. Soaps and detergents will not damage the shelter. After cleaning, the shelter is simply sprayed with water. Due to its smooth, non-porous surface the shelter will quickly dry.

While structural foam has been utilized in unrelated applications, primarily in the construction industry, the method of the invention represents a unique, novel application of structural foam, namely in the fabrication of the structural foam plastic shelters for pets.

The primary advantage of the shelter for pet animals according to the invention is that its structural foam construction provides far superior thermal insulation as contrasted with structural materials employed in conventional animal shelters. The enclosure within the shelter will remain warmer in winter and cooler in summer as the insulation factor of the structural foam employed in the shelter of the invention is greater than that of wood and that of conventional solid plastics that have heretofore been employed in the fabrication of pet animal shelters. Indeed, the inside surface of the cavity of the interior of a shelter according to the invention is 15 Fahrenheit degrees cooler than that of a conventional plastic shelter of the same configuration when the shelter is exposed to sunlight in 100 degree heat. As a consequence, an animal is able to remain within the shelter during weather that is hot enough to render conventional shelters uninhabitable.

In another broad aspect the present invention may be considered to be a method of fabricating a plastic shelter for animals. According to the method of the invention a charge of thermoplastic is heated under pressure. An inert gas is released and dispersed into the plastic charge. The thermoplastic charge is passed into a mold shaped to form a shelter for pet animals. Pressure is reduced on the plastic charge, thereby allowing the inert gas to expand the interior of the thermoplastic charge to form a foam core encapsulated within a solid skin.

In the preferred implementation of the invention, polyethylene plastic resin is employed as the thermoplastic charge. The charge of polyethylene is passed from a reservoir into a heated cylinder and is forced through the cylinder using an auger. Nitrogen gas, which serves as the inert gas or foaming or blowing agent, is injected under pressure into the thermoplastic charge in the cylinder. The thermoplastic charge with the injected nitrogen is metered into a mold cavity having the shape of an animal shelter. In one technique commonly termed the "short-shot technique" the flow of the thermoplastic into the mold cavity is terminated so that the charge initially only partially fills the mold. This has the effect of reducing pressure on the thermoplastic charge so that the nitrogen is able to expand the interior of the thermoplastic charge to form a foam core interior within a surrounding skin. A smooth, rigid encapsulating skin forms on all of the surfaces of the animal shelter where the charge contacts the surfaces of the mold. The expanded polyethylene charge is held in the mold intil it solidifies to form the finished animal shelter, whereupon it is removed from the mold.

In a variation of the implementation of the method of the invention a chemical blowing agent or foaming agent may be mixed with the charge of thermoplastic prior to heating the thermoplastic as an alternative to direct introduction of an inert gas under pressure. Suitable chemical blowing agents are inorganic or organic materials that decompose under the influence of heat to yield at least one gaseous decomposition product. The temperature at which the chemical foaming agent decomposes is the most important property governing suitability of a chemical blowing agent. The decomposition temperature of the blowing agent governs the conditions under which the foamable compound is to be processed.

The most suitable blowing agents are those which release nitrogen gas, since nitrogen is an inert gas in most plastic injection molding processes. One highly suitable nitrogen releasing chemical blowing agent is baking soda or sodium bicarbonate.

To obtain a uniform dispersion of a blowing agent within a thermoplastic charge, pellets of a thermoplastic resin are mixed with the blowing agent by tumbling the pellets together with the blowing agent, to thereby coat the pellets of plastic resin with the blowing agent. Regardless of the method of mixing employed, the foaming agent must be incorporated into the thermoplastic charge below the decomposition temperature of both the blowing agent and the thermoplastic resin. High density cellular thermoplastics are produced by heating the mixture of the blowing agent in the thermoplastic charge below the decomposition temperature of the thermoplastic employed to decompose the chemical blowing agent during the forming operation. This decomposition takes place in the extruder or in an injection mold.

Whether an additive which will release nitrogen or whether direct injection of nitrogen under pressure is employed, the critical factor in implementing the method and producing the product of the invention is that a unitary molded animal shelter is formed of a material that undergoes a density reduction by foaming the center of the thermoplastic charge to produce a solid skin on all exposed external surfaces. The resultant animal structure is significantly lighter in weight than a conventional plastic animal shelter having an equivalent wall thickness. Nevertheless, the exposed surfaces of the animal shelter are solid and the structural strength of the animal shelter is adequate. An animal shelter produced according to the invention has a strength-to-weight ratio which is superior to that of conventional molded plastic animal shelters.

The invention may be described with greater clarity and particularity by reference to the accompanying drawings.

DESCRIPTION OF THE EMBODIMENT AND IMPLEMENTATION OF THE METHOD

Figure 1:
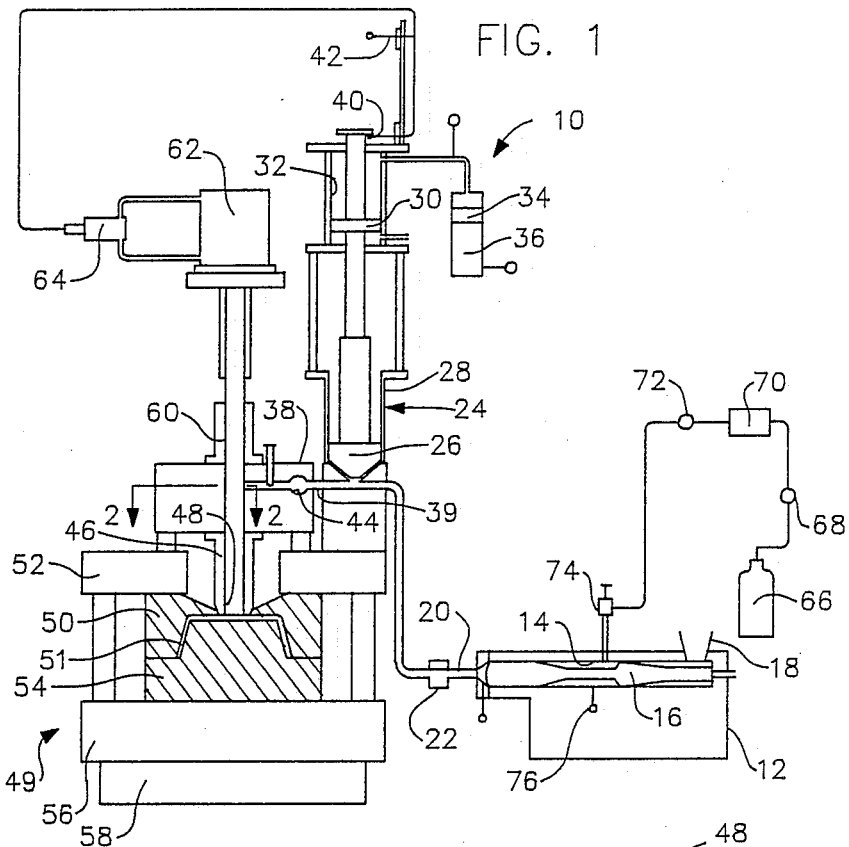
FIG. 1 is a schematic diagram illustrating a preferred manner of implementation of the method of manufacturing a shelter for a pet animal according to the invention.

FIG. 1 illustrates a structural foam injection molding apparatus indicated generally at 10. The structure of the injection molding apparatus 10 is a conventional structure of the type utilized to create structural foam building materials for use in the construction industry. The structural foam injection molding apparatus 10 includes an extruder section 12 within which a horizontally disposed cylinder 14 is defined. A screw or auger 16 is disposed within the cylinder 14 and includes a generally cylindrical shaft with radially outwardly directed helical flights thereon. The cylinder 14 is heated by heater bands which surround it. The screw or auger 16 rotates within the cylinder 14 to convey material from right to left, as viewed in FIG. 1, by means of the flights on the auger shaft. The auger 16 conveys a charge of a thermoplastic resin feedstock from a hopper or reservoir 18 and directs that charge through the cylinder 14.

A nitrogen supply reservoir 66 supplies nitrogen gas through a regulator valve 68 to a gas compressor 70. Compressed nitrogen gas is directed from the gas compressor 70 through a pressure regulating valve 72 to a nitrogen injection valve 74. The nitrogen injection valve 74 injects nitrogen into the cylinder 14 downstream from the flights on the auger 16.

Fill pipes 20 are located at the downstream extremity of the cylinder 14. The fill pipes 20 are maintained at a constant temperature and a safety relief valve 22 is located within each of the fill pipes 20. The fill pipes 20 are connected to inlets to a plastic accumulator section 24.

An accumulator piston 26 is mounted within a plastic accumulator cylinder 28. The accummulator piston 26 is operated by means of a hydraulic piston 30 which is mounted for reciprocal movement within a hydraulic cylinder 32. The hydraulic piston 30 may be forced downwardly by means of oil pressure within the cylinder 32. The hydraulic piston 30 in turn is actuated by means of a piston 34 located within a hydraulic accumulator 36. The piston 34 is actuated by means of nitrogen compressed within the hydraulic accumulator cylinder 36 at a pressure of approximately three thousand pounds per square inch.

When the hydraulic piston 30 is forced vertically downwardly, it forces plastic from the plastic accumulator section 24 through a line leading to a manifold 38. At the lower extremity of movement of the hydraulic piston 30, a limit switch 40 is actuated to terminate the compression stroke of the piston 26 in the plastic accumulator cylinder 28. When the hydraulic piston 30 is raised, the upward movement is limited by the limit switch 42 to allow a proper volume of molten thermoplastic to flow into the cylinder 28 of the plastic accumulator section 24.

Figure 2:
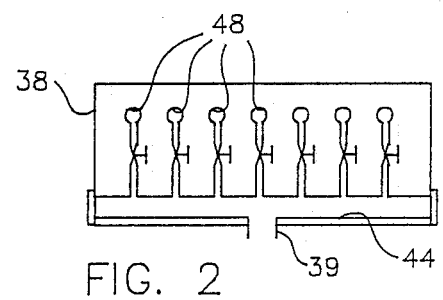
FIG. 2 is a transverse sectional detail taken along the lines 2—2 in FIG. 1.

A cross section of the manifold 38 is depicted in FIG. 2. The inlet line 39 from the plastic accumulator 24 is connected to a laterally extending manifold cavity 44 which in turn is connected to a plurality of nozzles 46, each having an injection passageway 48.

Each of the nozzles 46 contains a nozzle shut-off rod 60 which is moved in vertical reciprocal fashion by means of air pressure in an air cylinder 62. A four-way solenoid valve 64 advances and withdraws the shut-off rods 60. The nozzles 46 all communicate with a mold cavity 51 which is defined between a fixed aluminum mold section 50 that is held by a fixed mold platen 52 and a movable aluminum mold section 54 held by a movable mold platen 56. Upward pressure is exerted on the movable mold platen 56 by means of a hydraulic pressure actuator 58.

Unlike standard injection molding processes, the structural foam molding method of the invention is a low pressure system. That is, the pressure in the hydraulic accumulator 36 is typically maintained at about three thousand pounds per square inch. This allows aluminum, rather than steel molds to be utilized, since the mold sections 50 and 54 will not be damaged from the application of the relatively low pressure of three thousand pounds per square inch. The use of aluminum mold sections provides a better heat transfer and allows a molded structure to be produced with less strain and within a faster cycling time because the heat can be dissipated in less time.

To produce a shelter for a pet animal, in accordance with the implementation of the method of the invention, a charge of polyethylene resin feedstock is placed in the reservoir 18. The auger 16 is then rotated within the cylinder 14 to convey the thermoplastic charge to the left, as viewed in FIG. 1, through the cylinder 14. By using the auger 16 considerable shear energy is introduced into the polyethylene charge. The auger 16 also aids in mixing the polyethylene resin to enhance the uniformity of the melt temperature and the color of the material. As the auger 16 rotates, material is first conveyed along its outer surface by an overtype action. The polyethylene charge is heated by conduction from the wall of the cylinder 14 in the extruder 12. The wall of the cylinder 14 is heated by conventional heater bands (not shown) and by shearing action of the plastic feedstock as it is conveyed by the auger 16.

The right hand section of the cylinder 14 is termed the feed section. Melting of the plastic feedstock drawn from the reservoir 18 usually begins within the cylinder 14 about half-way down the length of the auger 16. The radial projection of the flights on the auger 16 decreases toward the center of the auger 16, so that as the plastic charge reaches the longitudinal central section of the auger 16, the compression ratio increases. The central section of the auger 16 and cylinder 14 is termed the transition section. Eventually the melted plastic charge reaches the longitudinal location along the auger 16 where the flight depth is at a minimum. This portion of the extruder 12 is termed the metering section.

At the metering section nitrogen gas is injected into the cylinder 14 under the control of the injection valve 74 which admits nitrogen from the gas compressor 70. The injected nitrogen gas serves as a foaming agent for the thermoplastic charge within the cylinder 14. A pressure gauge 76 is used to monitor pressure at the metering section. From the point of injection of nitrogen into the metering section of the extruder 12, the thermoplastic charge is passed under pressure with nitrogen gas homogenized therewithin. The pressure upon the gasified thermoplastic charge prevents the entrained nitrogen from expanding at this point, however.

The plastic charge then flows through the fill pipes 20 which are kept at a constant temperature. The plastic charge is then stored in the plastic accumulator cylinder 28. The pressure under which the plastic charge is maintained raises the accumulator piston 26 within the plastic accumulator cylinder 28 until the limit switch 42 is actuated. This occurs only when the accumulator cylinder 28 has been filled with a sufficient amount of material to create a pet animal shelter according to the invention.

When the limit switch 42 is actuated, the piston 34 in the hydraulic accumulator is forced upwardly, thereby transferring oil into the upper portion of the hydraulic cylinder 32. This depresses the hydraulic piston 30, which in turn causes the accumulator piston 26 to eject material from the accumulator cylinder 28. The ejected material is forced into the manifold 38 and through the injection passageways 48 in the nozzles 46. Expulsion of gassified plastic melt from the plastic accumulator cylinder 28 is terminated when the lower limit switch 40 is actuated. However, since the material in the fill pipes 20 is under pressure, the material in the manifold 38, unless restrained, will continue to flow through the nozzles 46. To prevent an excessive amount of material from being dispensed through the nozzles 46 and into the mold cavity 51, the air cylinder 62 is actuated by means of a four-way solenoid 64 to force the shut-off rods 60 downwardly into the injection passageways 48, thereby closing off further flow from the inlet line 39 through the manifold 38. By utilizing the shut-off rods 60, good shot control is maintained to precisely control the amount of material entering the cavity 51.

The flow of the plastic charge material through the nozzles 46 into the mold cavity 51 is terminated by the shut-off rods 60 so that the charge material initially only partially fills the mold cavity 51. That is, the polyethylene charge is passed in a "short shot" into the mold, thereby reducing pressure on the charge since the charge only partially fills the mold cavity 51. The short shot charge is held in the mold cavity 51. Since pressure is reduced upon the charge, the charge expands to form a foam core interior, indicated at 80 in FIG. 4, within rigid, relatively dense skin layers 82 and 84 which are formed wherever the polyethylene charge contacts the surfaces of the mold sections 50 and 54. The mold is vented to permit expansion of the charge. The polyethylene charge is held in the mold cavity 51 until it solidifies to form a molded animal shelter shell 88 of a complete animal shelter 86, depicted in FIG. 3. The animal shelter shell 88 is then removed from the mold 49.

Figure 3:
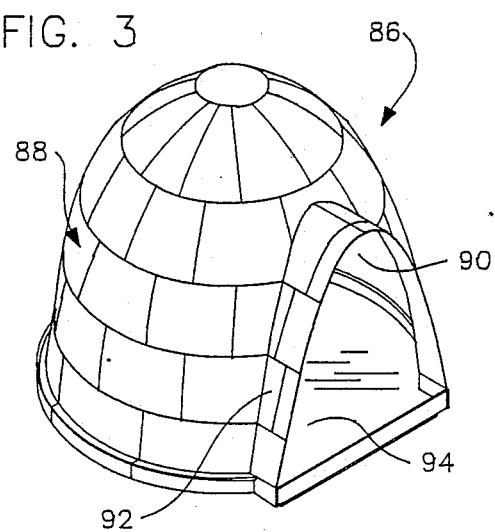
FIG. 3 is a prespective view of a pet animal shelter produced in accordance with the invention.

As illustrated in FIG. 3, the complete shelter 86 for pet animals is comprised of a molded, unitary polyethylene thermoplastic shell 88 having a concave interior surface defining a cavity indicated generally at 90 for sheltering a pet animal. Preferably, the shell 88 is formed with an arcuate doorway 92 which allows the pet to enter the enclosure 90 and which serves as a shield against rain and wind.

Figure 4:
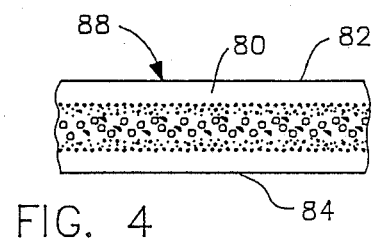
FIG. 4 is a sectional detail of the structural foam forming the animal shelter of FIG. 3.

A cross section of the structure of the shell 88 is depicted in FIG. 4. The shell 88 is formed with a solidified foam core 80 encased within a rigid skin having opposite rigid layers 82 and 84. The skin layers 82 and 84 are relatively dense as compared with the solidifed foam core 80. The difference in density of the skin layers 82 and 84 arises due to the fact that the polyethylene charge tends to stick to the surfaces of the mold sections 50 and 54 which it contacts upon entering the mold cavity 51. The nitrogen within the material dispenses into the mold cavity 51 causes the interior of the polyethylene charge to expand, however. This expansion is possible due to the reduction in pressure which results from only partially filling the cavity 51 with a short shot, and also due to the fact that the movable mold platen 56 yields and moves away from the stationary fixed platen 52 to an extent controlled by the hydraulic pressure actuator 58. Where the polyethylene charge sticks to the surfaces of the mold walls, it forms the dense, rigid skin layers 82 and 84. By forming the pet animal shelter 86 from structural polyethylene foam in the manner described, a shelter for pet animals is created which has a higher strength-to-weight ratio than the walls of conventional solid plastic animal shelters.

The structural foam shell 88 has a cellular core 80 encased within integral skin layers 82 and 84. The finished product has very good dimensional stability because the parts of the shelter 86 are formed almost stress free and with very little workage. Sink marks on the parts of the shelter 86 are virtually nonexistent.

The complete pet animal shelter 86 is preferably formed with a flat base 94 formed with peripheral lips adapted to releasably receive the lower edges of the shell 88. That is, the base 94 and the shell 88 may be releasably snapped together so that the base 94 forms a removable floor for the shelter 86. The base 94 is formed in the same manner and of the same material as the shell 88.

Because the shell 88 and the base 94 of the pet animal shelter 86 are fabricated from structural foam, the entire shelter 86 is free of stress and will not crack or craze. As with other plastics, the structural foam parts of the animal shelter 86 will not rot or corrode. Also, the surfaces of the shell 88 and the base 94 are not porous and these shelter parts will not absorb moisture and will not swell. Both the shell 88 and the base 94 provide excellent sound, heat and electrical insulation due to the presence of the foam core 80 within the skin layes 82 and 84.

Undoubtedly, numerous variations and modifications of the invention will become readily apparent to those familiar with the fabrication of pet animal shelters. For example, a chemical blowing or foaming agent may be employed as an alternative to the direct injection of a compressed gas in order to create the foaming action. The foaming agent, such as baking soda, may be mixed with the polyethylene plastic charge and placed in the reservoir 18 so that the blowing agent is mixed with the plastic resin from the inception. Pellets of the plastic resin charge may be coated with the blowing agent by tumbling the pellets together with the blowing agent. Regardless of whether a gas is directly injected into the plastic melt or is released by the decomposition of a blowing agent, an inert gas is introduced into the plastic charge and is dispersed therewithin. Accordingly, the scope of the invention should not be construed as limited to the specific manner of implementation of the method and the specific embodiment of the pet animal shelter depicted in the drawings, but rather is defined in the claims appended hereto.

We claim:

1. A shelter for an animal comprising a molded unitary thermoplastic shell formed from a molten thermoplastic which has been cooled, said shell having an interior surface defining a cavity for sheltering said animal, said shell being formed of a solidified thermoplastic structural foam plastic having a solidified plastic foam core encased between inner and outer rigid plastic layers, said inner and outer rigid plastic layers being made of a similar plastic as said solidified foam core, said inner and outer rigid plastic layers being integrally formed with said solidified foam core, said inner and outer rigid plastic layers being denser than said solidified foam core, said structural foam being formed by heating a charge of thermoplastic under pressure until said thermoplastic charge is molten, releasing and dispersing an inert gas into said molten thermoplastic charge, passing said molten thermoplastic charge into a mold shaped to form said shelter, reducing pressure on said thermoplastic charge to allow said inert gas to expand an interior of said thermoplastic charge, and permitting said thermoplastic charge to solidify to form said solidified foam core and said inner and said outer rigid plastic layers, said solidified foam core being encapsulated between said inner and said outer rigid plastic layers.

2. A shelter for an animal according to claim 1, further comprising a generally flat base formed of structural foam, said base being formed of a solidified plastic having a solidified plastic foam core encased between integral inner and outer rigid plastic layers, said inner and outer rigid plastic layers being made of a similar plastic as said solidified foam core, said inner and outer rigid plastic layers being integrally formed with said solidified foam core, said inner and outer rigid plastic layers being denser than said solidified foam core.

3. A shelter for an animal according to claim 2, wherein said shell is made of polyethylene.

4. A shelter for an animal according to claim 2, wherein said base is releasably secured to said shell, said base forming a raised, removable floor.

5. A shelter for an animal according to claim 2, wherein said base is made of polyethylene.

6. A shelter for an animal according to claim 1, wherein said shell comprises a single, unitary molded shelter which does not require assembly, said shell eliminating occurrences of cracks or interstices which might occur if assemblage of a plurality of separate elements is required to form said shell.

7. A shelter for an animal according to claim 1, wherein said shell does not have sharp edges.

8. A shelter for an animal according to claim 1, wherein all exposed surfaces of said shell are rigid, smooth, nonporous, do not absorb moisture or odor, will not rot, and thereby prevent fleas and ticks from burrowing into and incubating within said structural foam.

9. A shelter for an animal according to claim 1, wherein said shell provides thermal insulation from heat and cold, said thermal insulation being greater than that of wood or conventional solid plastics of similar wall thickness.

10. A shelter for an animal according to claim 1, wherein said shell weighs less than conventional plastic or wood pet shelters of similar size and wall thickness.

11. A shelter for an animal according to claim 1, wherein said shell has a greater strength-to-weight ratio than conventional plastic or wood pet shelters of similar size and wall thickness.

12. A shelter for an animal according to claim 1, wherein said shell has a concave interior surface which defines said cavity for sheltering said animal.

13. A shelter for an animal according to claim 1, wherein said shell further comprises an arcuate doorway which allows said animal to enter into said cavity, said arcuate doorway shielding said cavity against rain and wind.

14. A shelter for an animal according to claim 1, wherein said shell does not require use of a base, floor, or foundation.

* * * * *

Disclaimer 4,962,729—*Aurelio F. Barreto Sr.*, Hawthorne, Calif., *Darrell R. Paxman*, Redmond, Wash. INSULATED SHELTER FOR PET ANIMALS AND METHOD OF MANUFACTURE THEREOF. Patent dated Oct. 16, 1990. Disclaimer filed Feb. 4, 1991, by the assignee, Dogloo, Inc.

Hereby enters this disclaimer to claims 1, 8, 9, 10, 11, and 14 of said patent.
[*Official Gazette October 29, 1991*]